(12) United States Patent
Debban et al.

(10) Patent No.: US 10,845,558 B2
(45) Date of Patent: Nov. 24, 2020

(54) HIGH COUNT OPTICAL FIBER CABLE CONFIGURATION

(71) Applicant: OFS Fitel, LLC, Norcross, GA (US)

(72) Inventors: Harold P Debban, Snellville, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/426,536

(22) Filed: Feb. 7, 2017

(65) Prior Publication Data

US 2018/0224619 A1 Aug. 9, 2018

(51) Int. Cl.
*G02B 6/44* (2006.01)
(52) U.S. Cl.
CPC ............ *G02B 6/4434* (2013.01); *G02B 6/443* (2013.01); *G02B 6/4494* (2013.01)
(58) Field of Classification Search
CPC ....................................................... G02B 6/44
USPC ........................................................ 385/103
See application file for complete search history.

(56) References Cited

U.S. PATENT DOCUMENTS

| 4,322,829 | A | * | 3/1982 | Davis, Jr. | ............... | G01V 1/181 |
| | | | | | | 359/900 |
| 4,859,012 | A | * | 8/1989 | Cohn | .................. | G02B 26/0841 |
| | | | | | | 385/17 |
| 5,093,879 | A | * | 3/1992 | Bregman | ............ | G02B 6/4249 |
| | | | | | | 250/227.11 |
| 6,075,588 | A | * | 6/2000 | Pinsukanjana | ..... | G01N 21/3103 |
| | | | | | | 356/325 |
| 6,137,936 | A | * | 10/2000 | Fitz | ....................... | G02B 6/4422 |
| | | | | | | 385/100 |
| 6,236,789 | B1 | * | 5/2001 | Fitz | ....................... | G02B 6/4416 |
| | | | | | | 385/100 |
| 6,253,012 | B1 | * | 6/2001 | Keller | .................. | G02B 6/4436 |
| | | | | | | 385/103 |
| 6,275,250 | B1 | * | 8/2001 | Sanders | ............... | B23K 26/032 |
| | | | | | | 347/237 |
| 6,292,611 | B1 | * | 9/2001 | Chamberlain | ....... | G02B 6/4411 |
| | | | | | | 385/109 |
| 6,324,326 | B1 | * | 11/2001 | Dejneka | ............... | G02B 6/1228 |
| | | | | | | 359/341.1 |
| 6,459,837 | B1 | * | 10/2002 | Fitz | ....................... | G02B 6/4432 |
| | | | | | | 385/113 |
| 6,519,399 | B2 | | 2/2003 | Strong et al. | | |

(Continued)

*Primary Examiner* — Kaveh C Kianni
(74) *Attorney, Agent, or Firm* — Wendy W. Koba, Esq.

(57) ABSTRACT

A high count optical fiber cable is formed of a number of sub-unit components stranded around a central tension member. Each sub-unit component is formed to include the total number of individual fibers required to populate a given equipment rack (e.g., 288 fibers, for example). The individual fibers are preferably provided using a plurality of rollable optical fiber ribbons (permitting the large number of individual fibers to be compacted into a relatively small space), with water blocking material included in each sub-unit component. The sub-unit components may be formed to include individual strength members (i.e., in the form of sub-unit cables), or as loose tubes with an outer strength member disposed to surround the sub-units. Each sub-unit component is specifically sized to match the fiber capacity of, for example, a full equipment rack, minimizing the number of physical cables required for high density applications (e.g., data centers).

19 Claims, 4 Drawing Sheets

(56) References Cited

U.S. PATENT DOCUMENTS

| | | | |
|---|---|---|---|
| 6,655,853 B1* | 12/2003 | Yap | G02B 6/4214 385/88 |
| 6,721,480 B1 | 4/2004 | Bocanegra et al. | |
| 6,748,146 B2* | 6/2004 | Parris | G02B 6/4492 385/109 |
| 6,865,317 B2* | 3/2005 | Vahala | B23K 26/0823 385/30 |
| 6,937,801 B2* | 8/2005 | McAlpine | G02B 6/441 385/102 |
| 6,973,246 B2* | 12/2005 | Bocanegra | G02B 6/441 385/100 |
| 7,113,680 B2* | 9/2006 | Hurley | G02B 6/441 385/112 |
| 7,346,237 B2* | 3/2008 | Matsumura | G02B 6/32 385/34 |
| 8,577,196 B1* | 11/2013 | McNutt | G02B 6/4435 385/107 |
| 8,582,942 B1* | 11/2013 | Burnett | G02B 6/4434 385/102 |
| 8,639,075 B1* | 1/2014 | Burnett | G02B 6/4494 385/100 |
| 8,712,206 B2 | 4/2014 | Cooke et al. | |
| 8,748,797 B1* | 6/2014 | Decker | H03F 3/08 250/214 R |
| 9,031,369 B2* | 5/2015 | Debban | G02B 6/4483 385/102 |
| 9,097,869 B2* | 8/2015 | Hurley | G02B 6/4411 |
| 9,285,557 B2 | 3/2016 | Claeys et al. | |
| 2002/0122640 A1* | 9/2002 | Strong | G02B 6/4411 385/114 |
| 2002/0180944 A1* | 12/2002 | Fujii | G03F 7/2053 355/70 |
| 2003/0059182 A1* | 3/2003 | Johnson | G02B 6/4403 385/112 |
| 2003/0201462 A1* | 10/2003 | Pommer | G02B 6/4201 257/200 |
| 2004/0013437 A1* | 1/2004 | Wiltsey | G02B 6/2804 398/183 |
| 2004/0240489 A1* | 12/2004 | Teramura | G02B 27/0994 385/38 |
| 2004/0256542 A1* | 12/2004 | Okazaki | G02B 6/4249 250/227.11 |
| 2004/0258354 A1* | 12/2004 | Sekiya | G02B 6/32 385/35 |
| 2005/0105866 A1* | 5/2005 | Grudinin | B82Y 20/00 385/123 |
| 2006/0193576 A1 | 8/2006 | Lester et al. | |
| 2006/0193594 A1* | 8/2006 | Greenwood | G02B 6/4472 385/147 |
| 2006/0257150 A1* | 11/2006 | Tsuchiya | H04J 14/02 398/79 |
| 2007/0140640 A1* | 6/2007 | Temple, Jr. | G02B 6/4475 385/134 |
| 2008/0232749 A1* | 9/2008 | Rosenquist | G02B 6/4411 385/112 |
| 2008/0240663 A1* | 10/2008 | Dong | C03B 37/01211 385/125 |
| 2009/0003780 A1* | 1/2009 | Bringuier | G02B 6/4494 385/113 |
| 2009/0116797 A1 | 5/2009 | Stingl et al. | |
| 2009/0263089 A1* | 10/2009 | Keller | G02B 6/4484 385/109 |
| 2009/0304338 A1* | 12/2009 | Davidson | G02B 6/4413 385/111 |
| 2010/0027949 A1* | 2/2010 | Bringuier | G02B 6/4483 385/103 |
| 2010/0028020 A1* | 2/2010 | Gholami | G02B 6/0288 398/159 |
| 2011/0088433 A1* | 4/2011 | Allegretto | G01M 11/00 65/378 |
| 2011/0305256 A1* | 12/2011 | Chann | G02B 27/0905 372/75 |
| 2011/0306956 A1* | 12/2011 | Islam | A61B 18/20 606/15 |
| 2012/0114289 A1* | 5/2012 | DeMeritt | G02B 6/4214 385/79 |
| 2013/0039626 A1* | 2/2013 | Bickham | G02B 6/0365 385/124 |
| 2013/0287348 A1* | 10/2013 | Register, III | H01B 11/22 385/101 |
| 2014/0064680 A1* | 3/2014 | Register, III | G02B 6/4416 385/101 |
| 2014/0064681 A1* | 3/2014 | Register, III | G02B 6/4416 385/101 |
| 2014/0218738 A1* | 8/2014 | Bartoli | G01N 21/45 356/450 |
| 2016/0041354 A1* | 2/2016 | Guenter | G02B 6/4432 385/86 |
| 2016/0103288 A1 | 4/2016 | Jost et al. | |
| 2016/0209611 A1 | 7/2016 | Register, III | |

\* cited by examiner

HIGH COUNT OPTICAL FIBER CABLE CONFIGURATION

TECHNICAL FIELD

The present invention relates to an optical fiber cable and, more particularly, to a high count optical fiber cable configured to include sub-unit components, the sub-unit components sized to include a sufficient number of individual fibers for connection to a large number of separate connections (e.g., over 200 or more fibers per sub-unit component).

BACKGROUND OF THE INVENTION

There is an increasing use of high density communication networks that require a large numbers of optical and electrical cable connections to interconnect various types of network equipment. For example, data centers continue to be required for mass storage and necessitate the ability to retrieve stored information on demand. The associated equipment is often installed within cabinets in standard-sized equipment racks. Each piece of equipment typically provides one or more adapters to which optical or electrical patch cables ("jumper cables") can be physically connected to the equipment. These patch cables are generally routed to other network equipment located in the same cabinet or in another cabinet.

A common problem in such systems (particularly with respect to optical communication cables) is space management. Current practice is to utilize standard electronics racks or frames that support standards-sized stationary rack-mounted housing of various widths. In many cases, an equipment rack interconnects with 288 separate optical fibers, where this number is based on the availability of 12-count fiber ribbons, and thus requires 24 separate ribbons to accommodate the rack.

The need to handle multiple, separate ribbons in providing interconnections to each rack is a time-consuming task and may result, at times, in mistakes being made in associating the proper fiber (or ribbon) with the proper connection along a given rack.

SUMMARY OF THE INVENTION

The need remaining in the prior art is addressed by the present invention, which relates to high count optical fiber cable and, more particularly, to a high count optical fiber cable configured to include sub-unit components, the sub-unit components sized to include the number of individual fibers required to match the fiber capacity of an associated piece of equipment (e.g., over 200 or more fibers per sub-unit component).

In accordance with an exemplary embodiment of the present invention, an exemplary sub-unit component within a high count optical fiber cable is formed to include the total number of individual fibers required to populate a given equipment rack (e.g., 288 fibers, for example). The individual fibers are preferably provided using a plurality of rollable optical fiber ribbons, with water blocking material included in each sub-unit component. A plurality of sub-unit components is stranded over a central member to thus form a high count optical cable that is compact in size, yet able to contain the total number of fibers required for a specific piece of equipment (such as a cabinet requiring 1728 separate optical fibers).

In one embodiment of the present invention, each sub-unit component is itself configured as a cable, including a core tube disposed to encase the plurality of rollable ribbons (each ribbon comprising a known number of individual optical fibers, typically twelve fibers per ribbon). The core tube may be made from a flame-retardant material, thus improving the overall fire retardancy of the sub-unit component (as well, of course, the high count optical fiber cable itself). Strength members are disposed to surround the core tube, with a cable jacket disposed over the strength members. A group of such sub-unit cables is stranded to surround a central strength member, with an additional layer preferably disposed between the stranded sub-unit cables and a final outer jacket of the high count optical fiber cable (prevents the outer jacket from adhering to the sub-unit cable jackets). The final outer jacket is preferably selected to be sufficiently flame retardant so that the cable meets one or more cable fire safety standards.

In another embodiment, the plurality of rollable ribbons forming a sub-unit component is disposed in a buffer tube (no strength members included in the sub-unit component). The plurality of buffer tubes (forming the plurality of sub-unit components) is stranded around a central tension member. An outer strength member is disposed to cover the stranded group of buffer tubes, with an outer jacket covering this strength member.

An embodiment of the present invention may be formed to include water blocking materials, particularly as preferred for indoor/outdoor applications (e.g., an interconnection between active equipment located in two separate buildings in a campus environment). In one case, the inside of the core tube may contain water-swellable yarns (or other water-swellable material) to prevent water propagation along the length of the cable. Additionally, the layer between the stranded sub-unit cables and the final outer jacket may also incorporate a water blocking functionality. Similarly, an embodiment of the present invention may include an outer jacket formulated to include stabilizers that limit degradation from solar ultraviolet radiation.

One particular exemplary embodiment of the present invention takes the form of a high count optical fiber cable comprising a central tension member, a plurality of sub-unit components disposed to surround the central tension member (each sub-unit component including a plurality of individual fibers selected to match a fiber capacity of an associated equipment element), and an outer jacket disposed to surround the plurality of sub-unit components.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
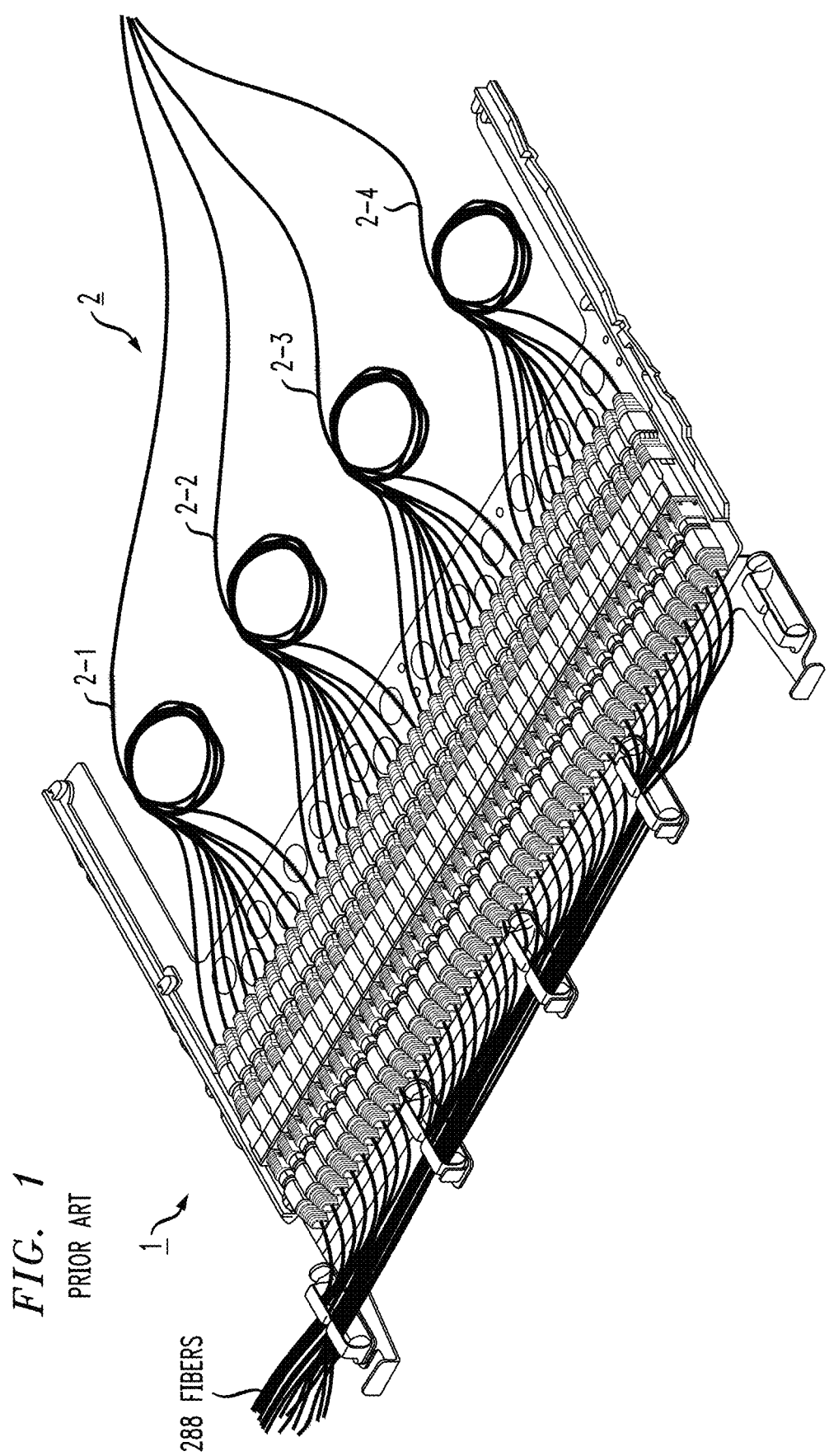
FIG. 1 illustrates a conventional prior art equipment rack and associated multiple optical cables required to provide the necessary number of connections.

FIG. 1 illustrates an exemplary prior art equipment rack 1 which is utilized to support the connection of a large number of separate optical fiber terminations. As mentioned above, a typical rack may require 288 separate optical fiber terminations. For the sake of illustration, FIG. 1 shows a set of four separate optical cables 2 being used to accommodate a relatively large number of fiber terminations. Each separate cable 2-1, 2-2, 2-3 and 2-4 is individually routed to rack 1, and then the various ribbons within each cable 2 furcated as necessary to present the individual fibers. Clearly, the need to work with several different cables to provide this interconnection to a single rack is cumbersome. Moreover, a typical equipment cabinet includes several racks, further increasing the tedious nature of working with multiple cables to provide all of the required connections.

Figure 2:
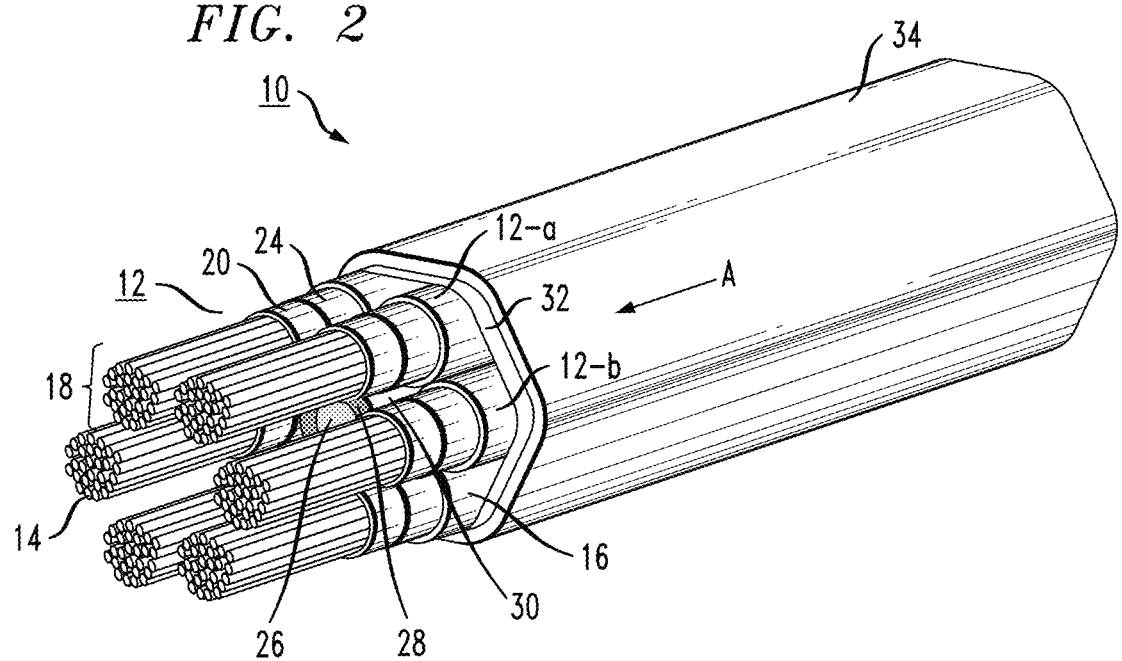
FIG. 2 is an isometric view of an exemplary high count optical fiber cable formed in accordance with the present invention.

FIG. 2 is an isometric view of an exemplary high count optical fiber cable 10 formed in accordance with the present invention to address the various concerns associated with providing connections to high density optical communications equipment. High count optical fiber cable 10 is configured to include a plurality of sub-unit components 12, where for the sake of clarity only two of these sub-unit components are identified; namely, components 12-a and 12-b. In accordance with the present invention, each sub-unit component 12 is sized to include a total number of individual fibers 14 required to interconnect to, for example, an equipment rack (e.g., 288 fibers per sub-unit component). In certain circumstances, it is conceivable that different sub-unit components may contain different fiber counts. However, in most cases, the inventive high count optical fiber cable 10 of the present invention will include a plurality of sub-unit component 12 where each sub-unit component contains a like number of optical fibers.

Figure 3:
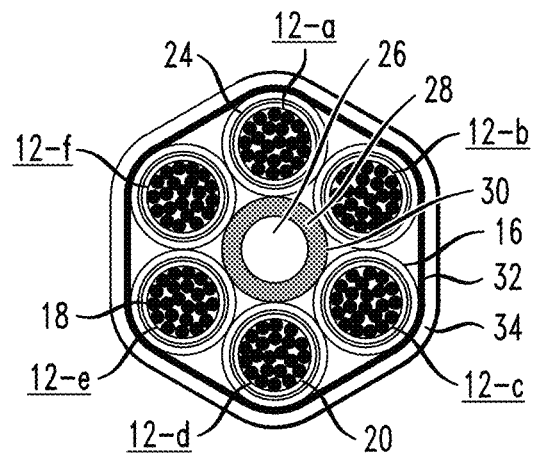
FIG. 3 is a cut-away end view of the high count optical fiber cable of FIG. 2.
Figure 4:
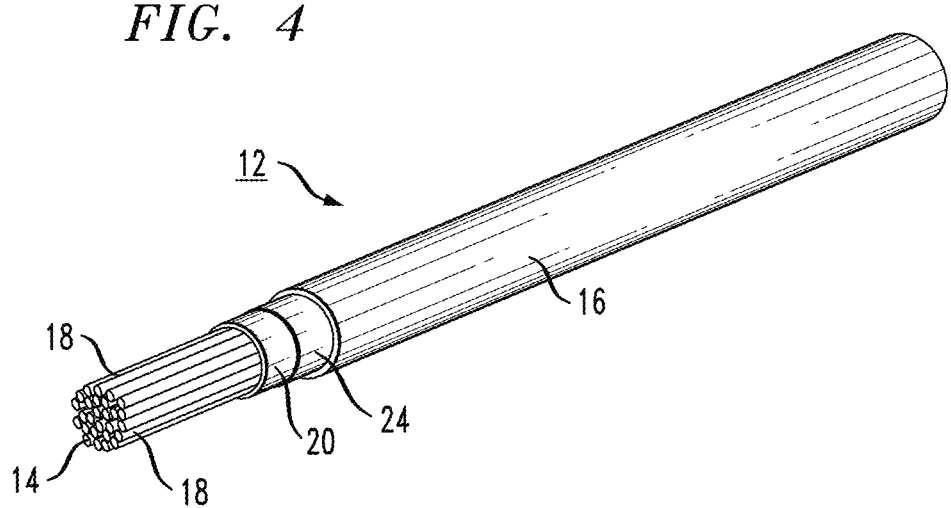
FIG. 4 is an isometric view of an exemplary sub-unit component as contained within the high count optical fiber cable of FIG. 2.
Figure 5:
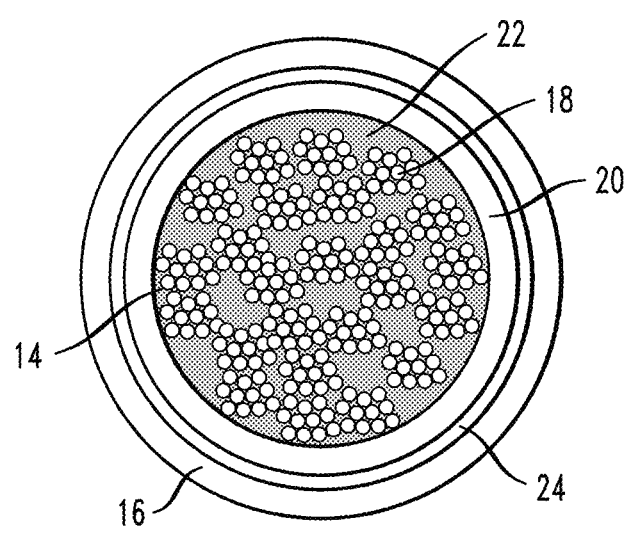
FIG. 5 is a cut-away end view of the sub-unit component of FIG. 4.

FIG. 3 is a cut-away view of high count optical fiber cable 10, illustrating the organization of elements forming cable 10. In this view, all six sub-unit components 12 are illustrated, shown as sub-unit components 12-a, 12-b, 12-c, 12-d, 12-e, and 12-f. FIG. 4 is an isometric view of an exemplary sub-unit component 12 and FIG. 5 is a cut-away end view of sub-unit component 12 of FIG. 4. The following discussion references all of FIGS. 2-5.

In accordance with this embodiment of the present invention, each sub-unit component 12 takes the form of a sub-unit "cable", with each sub-unit cable 12 having an outer jacket 16 (as best shown in FIGS. 4 and 5). A plurality of N rollable fiber ribbons 18 is disposed within each sub-unit cable 12, where the use of rollable ribbons provides a compact solution to configuring a high count optical fiber cable in accordance with the present invention. For example, presuming that each rollable ribbon 18 is formed of twelve individual fibers 14, a group of twenty-four rollable ribbons 18 is utilized to create a 288-count sub-unit cable 12. The cut-away view of sub-unit cable 12 as shown in FIG. 5 illustrates such a grouping of twenty-four individual rollable ribbons 18.

Continuing with the description of sub-unit cable 12 as depicted particularly in FIGS. 4 and 5, a sub-unit cable core tube 20 is utilized to contain the group of rollable ribbons 18. Core tube 20 may comprise a material selected from a group consisting of (but not limited to) the following: a high modulus thermoplastic polyolefin compound based on polypropylene; nylon; poly(butylene terephthalate); polycarbonate; poly(vinyl chloride) compounds; a high modulus thermoplastic polyurethane; poly(vinylidene fluoride) homopolymer; and poly(vinylidine fluoride) copolymer. It is to be understood that any selected core tube material may further be configured to incorporate a flame retardant functionality so as to increase the overall fire retardancy of the cable itself. In situations where water blocking is a concern (e.g., outdoor cable deployment), an interstitial water blocking material 22 may be disposed within core tube 20 to fill the empty spaces surrounding rollable ribbons 18. Exemplary water blocking material may include, for example, a gel, powder, water-blocking fibers, tape or the like.

In this particular embodiment, where each sub-unit component comprises a cable-like structure, a strength member 24 (formed of aramid fibers, fiberglass yarn, or other reinforcing yarns, for example) is disposed to surround core tube 20 (and is thus positioned between core tube 20 and jacket 16). Aramid yarn reinforcement may be preferred when one or both ends of the cable are pre-terminated using optical connections, such as MPO or LC connectors. Fiberglass yarns may be a preferred in the case of termination of the sub-unit cables in the field, due to its lower cost. Fiberglass yarns may also have a beneficial effect on cable flame retardancy, since the glass strands are not flammable. Each sub-unit cable 12 is considered as relatively robust and may be handled without fear that the individual ribbons 18 will be damaged during installation.

Returning to the description of high count cable 10 as shown in FIGS. 2 and 3, a plurality of sub-unit cables 12 are shown as disposed to surround a central tension member 26 (e.g., epoxy-fiberglass rod coated with a flame retardant compound). Preferably, sub-unit cables 12 are stranded in the longitudinal direction along the axis A of central tension member 26 to order to provide additional rigidity to the structure. Any suitable stranding arrangement may be used, such as "continuous lay" or "reverse oscillating lay" (ROL), where the latter technique reverses the direction of stranding (clockwise or counter-clockwise) after a certain number of standing twists.

In one configuration of this exemplary embodiment, a flame-retardant jacket layer 28 may be disposed over central tension member 26, with a layer of water blocking tape 30 covering jacket layer 28. The inclusion of water blocking tape 30 is particularly beneficial in outdoor cable installations.

The cut-away view of high count optical fiber cable 10 as shown in FIG. 3 illustrates an exemplary disposition of a plurality of six separate sub-unit cables 12 within high count cable 10 (shown as sub-unit cables 12-a, 12-b, 12-c, 12-d, 12-e, and 12-f). Presuming each sub-unit cable 12 is formed to include 288 separate fibers, high count cable 10 itself therefore contains a set of 1728 fibers, a number that is commonly associated with populating a given number of equipment racks, such as located at a high density data center. It is to be understood that this particular configuration is exemplary only, and a high count optical fiber cable formed in accordance with the present invention may contain more (or fewer) sub-unit cables, and the sub-unit cables themselves may be formed to contain more (or fewer) rollable ribbons.

Still referring to FIGS. 2 and 3, an outer water blocking tape layer 32 is disposed to surround the plurality of sub-unit cables 12. A cable jacket 34 forms the final, outer layer of high count optical fiber cable 10. Preferably, cable jacket 34 comprises a low-smoke, zero-halogen (LSZH) material. Use of such a material could allow for the overall cable to meet the requirements of international standards for flame spread, smoke emission, and acid gas generation. Other materials, such as but not limited to, poly(vinyl chloride) compounds, poly(vinylidene fluoride) homopolymer, poly-vinylidene fluoride) copolymer, and flame-retardant thermoplastic polyurethanes, may also be used. Cable outer jacket 34 may also incorporate stabilizers that prevent degradation by ultraviolet radiation exposure in the outdoor environment. Advantageously, the inclusion of outer water blocking tape layer 32 prevents cable jacket 34 from adhering to the individual jackets 16 of sub-unit cables 12.

As mentioned above, an alternative embodiment of the present invention forgoes the use of a "cable" structure for each sub-unit component. Instead, the plurality of rollable ribbons forming a sub-unit component is disposed in a buffer tube (no strength members included in the sub-unit component). The plurality of buffer tubes (forming the plurality of sub-unit components) is stranded around a central tension member. An outer strength member is disposed to cover the stranded group of buffer tubes, with an outer jacket covering this strength member. This modification of the design reduces the overall robustness of the sub-units, but has the beneficial effect of reducing the overall diameter of the cable, which may be desirable in environments where space is at a minimum (e.g., a crowded data center where overhead rack space is at a premium).

Figure 6:
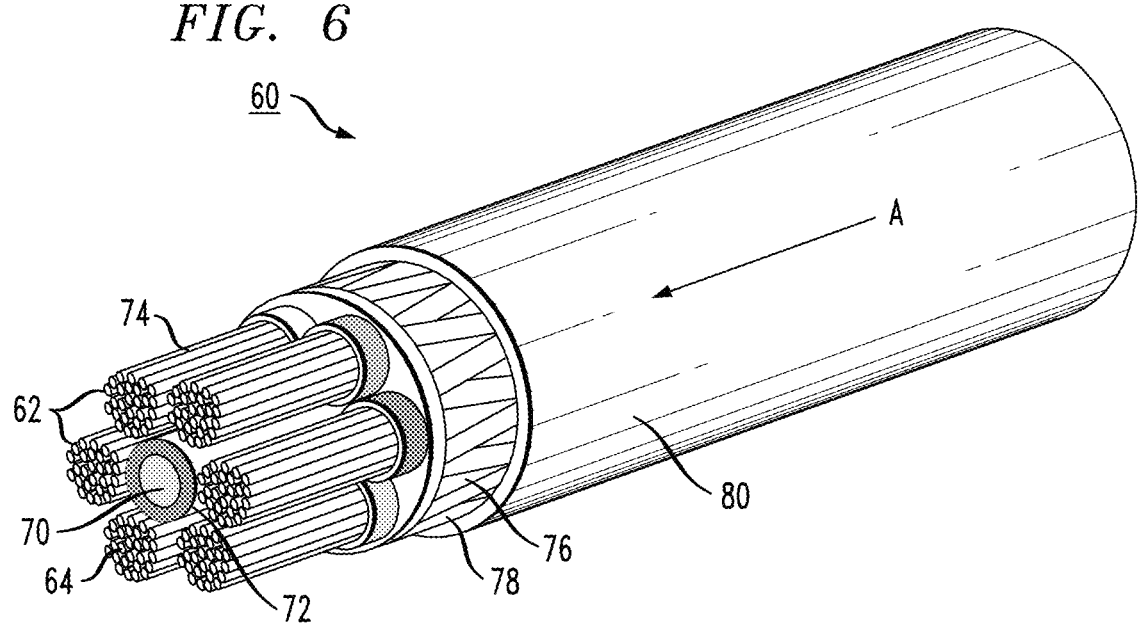
FIG. 6 is an isometric view of an alternative embodiment of the present invention.
Figure 7:
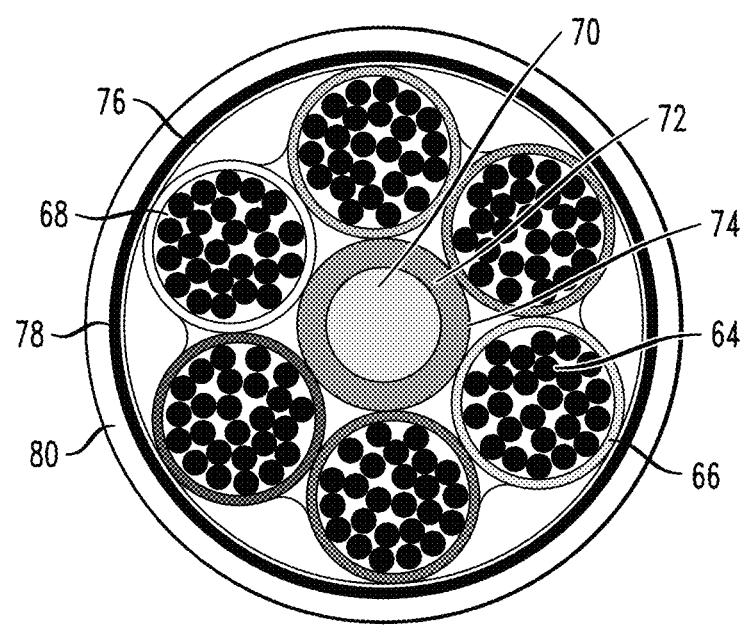
FIG. 7 is a cut-away end view of the inventive high count optical fiber cable as shown in FIG. 6.

FIG. 6 is an isometric view of this alternative embodiment of the present invention, specifically, a high count optical fiber cable 60. FIG. 7 is a cut-away view of high count optical fiber cable 60 as shown in FIG. 6. Similar to the above-described embodiment, high-density cable 60 includes a plurality of sub-unit components 62, with each sub-unit component 62 housing a plurality of rollable fiber ribbons 64. Again, the use of rollable ribbons creates a compact assembly. In one embodiment, a set of twenty-four rollable ribbons 24 may be included within each sub-unit component 62.

In this embodiment of the present invention, each sub-unit component is configured to house the plurality of rollable ribbons 64 within a buffer tube 66. Interstitial water blocking material 68 (shown in FIG. 7) may also be included within each buffer tube 66.

In creating the complete cable structure of this buffer tube embodiment, the plurality of sub-unit components 62 is disposed to surround a central tension member 70. A jacket layer 72 is utilized to cover central tension member 70. A layer 74 of water blocking tape may be used to cover jacket layer 72. Again, sub-unit components 62 are preferably stranded along the longitudinal axis A of tension member 70 to provide rigidity to the final structure of high count optical fiber cable 60.

As also shown in FIGS. 6 and 7, an outer layer 76 of water blocking and/or flame retardant tape is then disposed over the collection of stranded sub-unit components 62, which also functions to hold sub-unit components 62 in a fixed position.

In contrast to previously-described high count optical fiber cable 10, high count optical fiber cable 60 does not contain individual strength members within each sub-unit component (i.e., there are no "core tubes" used in the configuration of sub-unit components 62). In order to provide the desired structural integrity for high count optical fiber cable 60, therefore, an outer strength member 78 (formed of aramid fibers, fiberglass yarns, or the like) is disposed over outer tape layer 76. Again, fiberglass yarns may be a preferred material for outer strength member 78, inasmuch as they provide an additional degree of flame retardance to the cable. A flame retardant jacket 80 forms the final, outer layer of cable 60.

While the foregoing represents preferred embodiments of the invention, it will be understood by those skilled in the art that various modifications and changes may be made without departing from the spirit and scope of the invention, and that the invention includes all such modifications and changes as come within the scope of the invention as defined by the following claims appended hereto.

What is claimed is:

1. A high count optical fiber cable comprising
a central tension member;
a plurality of sub-unit cables disposed to surround the central tension member, each sub-unit cable including
a plurality of at least 200 individual fibers configured as a plurality of rollable fiber ribbons with each rollable ribbon including at least 12 individual fibers and rolled into a compact form, the total number of individual fibers selected to match a fiber capacity of an associated high density communication equipment element;
a sub-unit core tube disposed to surround the plurality of rollable fiber ribbons;
a sub-unit strength member disposed to surround the sub-unit core tube, providing mechanical protection for the sub-unit cable; and
a sub-unit jacket disposed to surround the sub-unit strength member; and
an outer jacket disposed to surround the plurality of sub-unit cables wherein each sub-unit components of the plurality of sub-unit components comprises a buffer tube, each buffer tube encasing the plurality of individual fibers; wherein the cable further comprises an outer strength member disposed between the plurality of buffer tubes and the outer jacket.

2. The high count optical fiber cable as defined in claim 1 wherein the central tension member comprises
a central core element; and
a tension member jacket disposed to cover the central core element.

3. The high count optical fiber cable as defined in claim 2 wherein the tension member jacket is formed of a flame-retardant material.

4. The high count optical fiber cable as defined in claim 2 wherein the central tension member further comprises
a water blocking layer disposed over the tension member jacket.

5. The high count optical fiber cable as defined in claim 1 wherein each sub-unit cable further comprises interstitial water blocking material disposed within gaps between the plurality of at least 200 individual fibers and an inner surface of the sub-unit core tube.

6. The high count optical fiber cable as defined in claim 5 wherein the interstitial wafer blocking material comprises a water-swellable material.

7. The high count optical fiber cable as defined in claim 6 wherein the water-swellable material comprises a water-swellable fiber.

8. The high count optical fiber cable as defined in claim 1 wherein the sub-unit strength member included in each sub-unit cable of the plurality of sub-unit cables comprises a water-blocking strength member.

9. The high count optical fiber cable as defined in claim 1 wherein the sub-unit strength member included in each sub-unit cable of the plurality of sub-unit cables is formed of material selected from the group consisting of: aramid yarn and fiberglass yarn.

10. The high count optical fiber cable as defined in claim 1 wherein the sub-unit core tube included in each sub-unit cable of the plurality of sub-unit cables is formed of a flame-retardant material.

11. The high count optical fiber cable as defined in claim 1 wherein the sub-unit core tube included in each sub-unit cable of the plurality of sub-unit cables comprises a material selected from the group consisting of: a high modulus thermoplastic polyolefin compound based on polypropylene; nylon; polybutylenes terephthalate; polycarbonate; polyvinyl chloride compounds; a high modulus thermoplastic polyurethane; polyvinylidene fluoride homopolymer and polyvinylidine fluoride copolymer.

12. The high count optical fiber cable as defined in claim 1 wherein each buffer tube is formed of a flame-retardant material.

13. The high count optical fiber cable as defined in claim 1 wherein the outer strength member is formed of a material selected from the group consisting of aramid yarns and fiberglass yarns.

14. The high count optical fiber cable as defined in claim 1 wherein the cable further comprises a layer of water blocking tape disposed between the outer strength member and the outer jacket.

15. The high count optical fiber cable as defined in claim 1 wherein each plurality of individual optical fibers within each buffer tube is configured as a plurality of rollable optical fiber ribbons.

16. The high count optical fiber cable as defined in claim 1 wherein the plurality of sub-unit cables is disposed in a stranded configuration around the central tension member.

17. The high count optical fiber cable as defined in claim 1 wherein the outer jacket is formed of a low-smoke, zero-halogen material.

18. The high count optical fiber cable as defined in claim 1 wherein the outer jacket comprises a material selected from the list consisting of: polyvinyl chloride compounds, polyvinylidene fluoride homopolymer, polyvinylidene fluoride copolymer, and flame-retardant thermoplastic polyurethanes.

19. The high count optical fiber cable as defined in claim 1 wherein the outer jacket is formed to include stabilizing material that minimizes degradation associated with ultraviolet radiation.

* * * * *